(12) United States Patent
Unrath et al.

(10) Patent No.: US 8,642,918 B2
(45) Date of Patent: Feb. 4, 2014

(54) ADAPTIVE OPTIC BEAMSHAPING IN LASER PROCESSING SYSTEMS

(75) Inventors: Mark A. Unrath, Portland, OR (US);
Peter Pirogovsky, Portland, OR (US);
Leo Baldwin, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 13/494,839

(22) Filed: Jun. 12, 2012

(65) Prior Publication Data
US 2012/0250134 A1 Oct. 4, 2012

Related U.S. Application Data

(63) Continuation of application No. 12/207,338, filed on Sep. 9, 2008, now Pat. No. 8,198,564.

(51) Int. Cl.
*B23K 26/06* (2006.01)
*B23K 26/073* (2006.01)

(52) U.S. Cl.
USPC ............ 219/121.61; 219/121.62; 219/121.68; 219/121.69; 219/121.83; 359/238; 359/239; 372/26

(58) Field of Classification Search
USPC ............. 219/121.61, 121.62, 121.68, 121.69, 219/121.83; 359/238, 239, 279, 637; 372/26
See application file for complete search history.

(56) References Cited

U.S. PATENT DOCUMENTS

| 4,719,183 A | 1/1988 | Maekawa |
| 5,925,271 A | 7/1999 | Pollack et al. |
| 6,008,914 A * | 12/1999 | Sasagawa et al. ............... 359/15 |
| 6,335,916 B1 | 1/2002 | Endo et al. |
| 6,972,887 B2 | 12/2005 | Wickham et al. |
| 2002/0163735 A1 | 11/2002 | Detlef et al. |
| 2003/0222324 A1 | 12/2003 | Sun et al. |
| 2005/0274702 A1* | 12/2005 | Deshi ....................... 219/121.72 |
| 2006/0092491 A1 | 5/2006 | Wang |
| 2006/0256335 A1 | 11/2006 | Chen |
| 2009/0086325 A1 | 4/2009 | Liu et al. |

FOREIGN PATENT DOCUMENTS

| JP | 63136018 | 6/1988 |
| JP | 08021964 A | 1/1996 |
| JP | 2004136358 | 5/2004 |
| JP | 2005205469 | 8/2005 |
| JP | 2006007257 | 1/2006 |
| JP | 2006212698 | 8/2006 |

OTHER PUBLICATIONS

Avino, Saverio et al., "Super-Gaussian Laser Beam Shaping Using Deformable Mirrors and Intrinsic Beam Quality Metrics," Center for Automation Technoloies and Systems, Rensselaer Polytechnic Institute, Troy, NY, USA (3 pp.).

(Continued)

*Primary Examiner* — Samuel M Heinrich
(74) *Attorney, Agent, or Firm* — Stoel Rives LLP (57) ABSTRACT

A laser processing system quickly and flexibly modifies a processing beam to determine and implement an improved or optimum beam profile for a particular application (or a subset of the application). The system reduces the sensitivity of beam shaping subsystems to variations in the laser processing system, including those due to manufacturing tolerances, thermal drift, variations in component performance, and other sources of system variation. Certain embodiments also manipulate lower quality laser beams (higher $M^2$ values) to provide acceptable shaped beam profiles.

20 Claims, 7 Drawing Sheets

(56) References Cited

OTHER PUBLICATIONS

Shealy, David L. et al., "Laser Beam Shaping," Optical Engineering, vol. 41, No. 11, Nov. 2003, pp. 3077-3079.

Rogers, Stanley et al., "Adaptive optics systems implemented using two-dimensional phase retrieval and microelectromechanical deformable mirror," Opt. Eng. 39(10), pp. 2763-2774 (Oct. 2000).

El-Agmy, R. et al., "Adaptive beam profile control using a simulated annealing algorithm," Optic Express, vol. 13, No. 16, Aug. 8, 2005, pp. 6085-6091.

International Search Report and Written Opinion mailed Apr. 19, 2010, for PCT/US2009/056045, filed Sep. 4, 2009, 11 pps.

Mermillod-Blondin, Alexandre et al., "Dynamic Pulsed-Beam Shaping Using a TAG Lens in the Near UV," Applied Physics A, (2008), 93: 231-234, Jun. 8, 2008.

Notice of Allowance and Fee(s) Due mailed Feb. 9, 2012, for U.S. Appl. No. 12/207,338, filed Sep. 9, 2008.

Sanner, N., et al., "Direct Ultrafast Laser Micro-Structuring of Materials Using Programmable Beam Shaping," Optics and Lasers in Engineering 45 (2007) 737-741, Dec. 6, 2006.

\* cited by examiner

ADAPTIVE OPTIC BEAMSHAPING IN LASER PROCESSING SYSTEMS

RELATED APPLICATION

This application is a continuation of U.S. patent application Ser. No. 12/207,338, filed Sep. 9, 2008, now issued as U.S. Pat. No. 8,198,564, which is hereby incorporated by reference herein in its entirety.

TECHNICAL FIELD

This disclosure relates to laser processing. More particularly, this disclosure relates to using adaptive optics to rapidly change the shape of a spatial intensity profile of a laser beam during material processing.

BACKGROUND INFORMATION

Many laser processing systems use a process spot with a specified spatial intensity profile at a work surface to optimize a particular laser process. Beamshaping methods for producing the desired spatial intensity profile include, for example, using diffractive and refractive optic elements. These approaches pose design challenges, however, due to restrictive input laser beam tolerances (e.g., for position, diameter, mode quality, and other parameters) generally required to maintain acceptable output beam characteristics. Production laser processing systems are generally designed to meet such output laser beam characteristics despite variations in input laser beam characteristics and/or laser beam delivery optics. Such variations may occur, for example, over time, as temperature changes, and/or with variations in system components (e.g., from one system to another system).

Typical approaches for generating a laser beam with a desired spatial intensity profile use pre-designed hard optical elements, which rely on certain beam characteristics for proper operation. For example, a diffractive optical element (DOE) produces a shaped beam with desired characteristics (e.g., peak intensity variation, spatial cutoff band, maximum sidelobe amplitude, and other characteristics) when used with a Gaussian beam that has a particular centroid, X and Y diameter, spatial mode content, and wavefront error. The output shaped beam characteristics degrade, however, as the input beam characteristics deviate from the specifications used to design the DOE.

Because a DOE is generally made for a particular application, the output beam shape cannot be easily modified once the DOE is designed. Thus, if a particular laser process uses a new output beam shape or a variety of output beam shapes for optimum process quality or speed, the existing methods that use pre-designed hard optical elements are cumbersome and/or impractical. An exception to this is the manipulation of the output beam by scaling (e.g., through variable magnification) and rotation (e.g., through devices such as Dove prisms). These methods are adequate in some applications but may be inadequate or restrictive other applications.

SUMMARY OF THE DISCLOSURE

Thus, certain embodiments disclosed herein include a laser processing system that quickly and flexibly modifies the processing beam to determine and implement an improved or optimum beam profile for a particular application (or a subset of the application). The system reduces the sensitivity of beam shaping subsystems to variations in the laser processing system, including those due to manufacturing tolerances, thermal drift, variations in component performance, and other sources of system variation. Certain embodiments also manipulate lower quality laser beams (higher $M^2$ values) to provide acceptable shaped beam profiles.

In one embodiment, a method for processing a workpiece uses a laser beam with a selectively shaped spatial intensity profile. The method includes associating a first portion of the workpiece with a first set of processing characteristics and a second portion of the workpiece with a second set of processing characteristics. The method also includes associating a first spatial intensity profile with the first set of characteristics and a second spatial intensity profile with the second set of characteristics. One or more adaptive optics modulate at least one of the phase and the amplitude of an input laser beam to generate an output laser beam that has the first spatial intensity profile. The output laser beam having the first spatial intensity profile then processes the first portion of the workpiece. The method also includes dynamically switching, within a predetermined switching time, from the first spatial intensity profile of the output laser beam to the second spatial intensity profile of the output laser beam by adjusting the modulation of the input laser beam using the one or more adaptive optic elements, and processing the second portion of the workpiece using the output laser beam having the second spatial intensity profile. The predetermined switching time according to some embodiments is in a range between approximately 100 μs and approximately 5 ms.

In another embodiment, a laser processing system uses a selectively shaped spatial intensity profile to process a workpiece. The system includes a laser source to generate an input laser beam, and a spatial filter to spatially separate the input laser beam into a first beam component that has a low-order transverse mode and a second beam component that has a higher-order transverse mode as compared to that of the first beam component. The system also includes a first adaptive optic element to modulate at least one of the phase and the amplitude of the first beam component, a second adaptive optic element to modulate at least one of the phase and the amplitude of the second beam component, and optics to recombine the modulated first beam component and the modulated second beam component into an output laser beam for processing the workpiece.

Additional aspects and advantages will be apparent from the following detailed description of preferred embodiments, which proceeds with reference to the accompanying drawings.

DETAILED DESCRIPTION OF PREFERRED EMBODIMENTS

Adaptive optics are integrated into an optical train of a laser processing system to flexibly and rapidly shape the spatial intensity profile of the processing beam. The adaptive optics are configured to phase modulate and/or amplitude modulate the laser beam so as to rapidly switch between two spatial intensity profiles. While both phase and/or amplitude modulation may be used in the embodiments discussed herein, phase modulation may be preferred in certain embodiments due to its ability to maintain a relatively higher optical efficiency than that of amplitude modulation. The time used by the laser processing system to change its output from a first spatial intensity profile to a second spatial intensity profile may be referred to herein as a "switching time." In one embodiment, for example, the switching time of the laser processing system is in a range between approximately 100 µs and approximately 5 ms. An artisan will recognize from the disclosure herein that other switching times may also be used, based on the responsiveness of the adaptive optics selected for a particular application.

The laser processing system according to one embodiment is configured to generate a shaped processing beam with characteristics that may be selectively modified. For example, the system may generate a laser beam that has an elliptically shaped spatial intensity profile to cut a linear portion of a trench in a workpiece. The system may then switch to a laser beam that has a circularly shaped spatial intensity profile to cut a curved portion of the trench in the workpiece. In another example, the system may process a portion of a workpiece feature using a relatively large shaped beam, and the system may process another portion of the feature using a tightly focused Gaussian spot. As another example, the system may process a low-density area using a first shaped beam of a particular size and fluence. The system may then process a denser area using a second, smaller shaped beam with equivalent power, but with a higher fluence than that of the first shaped beam. In yet another example, the system may change the orientation of a shaped beam during processing of the workpiece. For example, the system may rotate an axis of a rectangular beam by approximately 90° (e.g., from an X-axis to a Y-axis) when cutting a corner section of a trench in a workpiece.

In addition, or in another embodiment, the laser processing system provides feedback to the adaptive optics for additional or corrective adjustments to the desired spatial intensity profile. For example, the optimum characteristics (e.g., shape, resolution, apodization, wavefront, and other characteristics) of the processing beam may not be well known in advance. In such embodiments, the system is configured to quickly modify processing beam profiles and evaluate their performance on the workpiece. As discussed above, iterating through a series of hard-optic beam shapers to evaluate the resulting profiles may be prohibitive and undesirable. The embodiments disclosed herein, however, greatly simplify this process.

In addition, or in another embodiment, the laser processing system includes a spatial filter separator to separate high quality beam modes (e.g., $TEM_{00}$ modes) from low quality beam modes (e.g., non-$TEM_{00}$ modes). The system separately modifies the high quality beam modes and the low quality beam modes using, for example, two or more adaptive optic components. The system then combines the modified high quality modes with the modified low quality modes for workpiece processing. Generally, conventional systems that use spatial filtering substantially remove the lower quality beam modes from the output beam. This increases the resolution of the output beam at the expense of reducing the output beam's power. By separately modifying the high and low quality modes using adaptive optics, as disclosed herein, the system can recombine the modes to generate a high resolution profile with reduced power loss.

Thus, the laser processing system can use, or adjust for, a degraded or low quality input laser beam. For example, it may be beneficial to make use of laser sources that have desirable characteristics (e.g., pulse energy, pulse frequency, pulse width, wavelength, and other characteristics), but which have degraded beam quality (e.g., $M^2$ beam quality). Conventional beamshaping optics may require and/or assume that the input beam is a high quality (low $M^2$) beam. If the input beam quality is degraded, the output beam shape generally suffers degradation, occasionally to the point where it cannot efficiently or reasonably be used in the desired application. In some cases, the characteristics of individual beams are acceptable (if known during the beamshaping design process), but vary during laser processing such that consistent performance is not easily obtained. Certain embodiments disclosed herein, however, allow the system to separately modify the high and low quality components of the input beam so that even a low quality or degraded input beam can be used to process the workpiece.

Reference is now made to the figures in which like reference numerals refer to like elements. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

Figure 1:
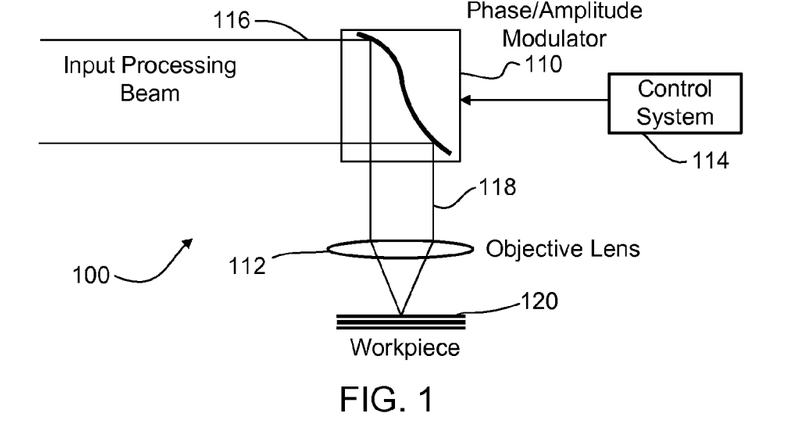
FIG. 1 is a block diagram of a laser processing system that includes a phase/amplitude modulator according to one embodiment.

FIG. 1 is a block diagram of a laser processing system 100 that includes a phase/amplitude modulator 110 according to one embodiment. The laser processing system 100 may also include an objective lens 112 and a control system 114. The control system 114 may include, for example, a processor and a computer storage medium (not shown) configured to store computer executable instructions and data used to perform the methods described herein. The phase/amplitude modulator 110 includes adaptive optics that are integrated into the optical train of the laser processing system 100 so as to flexibly and rapidly shape the spatial intensity profile of an input processing laser beam 116. The objective lens 112 focuses the conditioned processing laser beam 118 received from the phase/amplitude modulator 110 onto a workpiece 120 (e.g., for scribing, dicing, via drilling, and/or other material processing), to produce the desired shaped processing beam.

As shown in FIG. 1, the phase/amplitude modulator 110 is configured to phase and/or amplitude modulate the input processing beam 116 based on control signals received from the control system 114. The operation of the phase/amplitude modulator 110 may be based on fundamental Fourier optics, e.g., the Fourier transform of the beam at a front principal plane of a lens is produced at a back focal plane of the lens. Thus, the phase/amplitude modulator 110 manipulates the phase and/or amplitude characteristics of the input processing beam 116 to generate an arbitrarily shaped spatial intensity profile at the output focal plane. As an artisan will recognize from the disclosure herein, the shape of the spatial intensity profile may depend on the diffraction constraints of the optical system (e.g., related to beam diameter, focal length, and other constraints).

In one embodiment, the control system 114 provides a predetermined set of input signals to the phase/amplitude modulator 110 so as to generate a particular spatial intensity profile for the output beam 118. For example, given known input beam 116 characteristics (e.g., phase and amplitude distribution), and desired output beam 118 characteristics, the control system 114 may precalculate the characteristics of the phase/amplitude modulator 110 (assuming a feasible solution exists given the diffraction constraints of the optical system). In one embodiment, an iterative Gerchberg-Saxton algorithm, for example, may be used to precalculate the modulation. The characteristics of the phase/amplitude modulator 110 may be based, for example, on previously performed tests or experiments corresponding to a particular spatial intensity profile.

In one embodiment, the control system 114 precalculates input signals or characteristics of the phase/amplitude modulator 110 for a number of different desirable output beam 118 characteristics. Thus, the phase/amplitude modulator 110 may switch its characteristics during processing to provide the various output beams as dictated by the control system 114. As discussed above, the phase/amplitude modulator 110 may switch its characteristics based on a particular feature or portion of the workpiece 120 being processed (e.g., changing from a linear to a curved portion of a trench, or changing from a low-density area to a high-density area.

Figure 2:
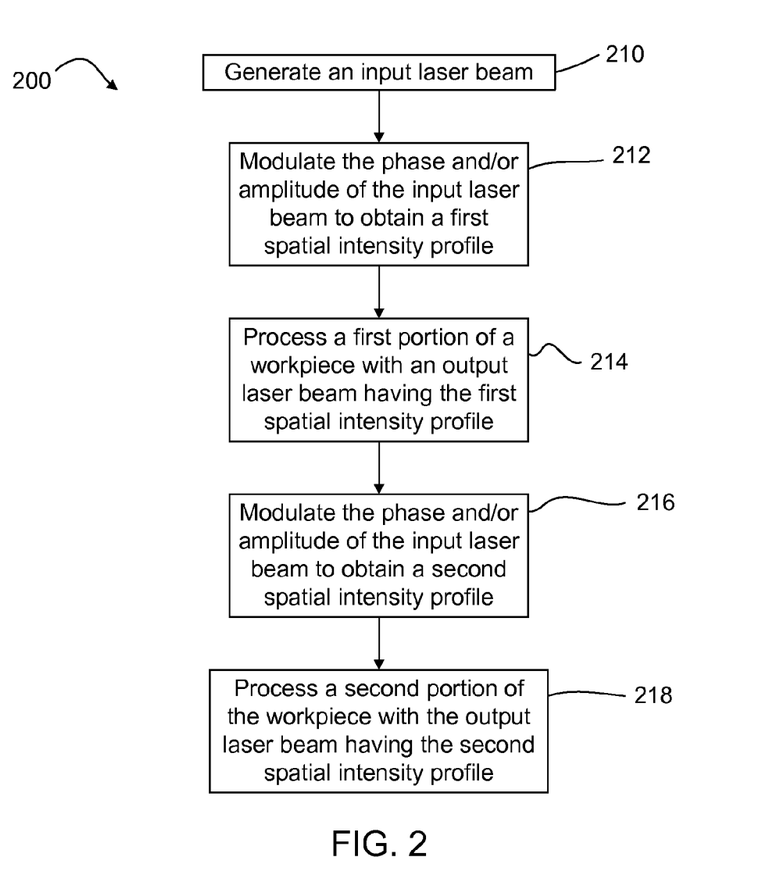
FIG. 2 is a flow chart of a method for laser processing different portions of a workpiece with different spatial intensity profiles according to one embodiment.

For example, FIG. 2 is a flow chart of a method 200 for laser processing different portions of a workpiece with different spatial intensity profiles according to one embodiment. Referring to FIGS. 1 and 2, the method 200 includes generating 210 an input laser beam 116 and modulating 212 the phase and/or amplitude of the input laser beam 116 to obtain a first spatial intensity profile. The method 200 also includes processing 214 a first portion of the workpiece 120 with an output laser beam 118 having the first spatial intensity profile. The control system 114 may be programmed, for example, to associate the first portion of the workpiece 120 with the first spatial intensity profile. In one embodiment, the first portion of the workpiece 120 may be associated with a type of feature (e.g., linear trench, curved trench, or material with a particular density) or structure (e.g., fusible link) that, in turn, is associated with the first spatial intensity profile.

The method 200 also includes modulating 216 the phase and/or amplitude of the input laser beam 116 to obtain a second spatial intensity profile. The method 200 further includes processing 218 a second portion of the workpiece 120 with the output laser beam having the second spatial intensity profile. As with the first spatial intensity profile, the control system 114 may be programmed to associate the second portion of the workpiece 120 with the second spatial intensity profile and/or a type of feature or structure associated with the second spatial intensity profile.

Using adaptive optics to modulate the phase and/or amplitude of the input processing beam 116, the method 300 provides fast switching times between the first spatial intensity profile and the second spatial intensity profile. Amplitude modulation may be achieved, for example, using a micromirror array. However, amplitude-only modulation may have limited optical efficiency and spot size. Thus, in certain embodiments, phase modulation is combined with (or used in place of) amplitude modulation. As discussed above, in one embodiment, the switching time is in a range between approximately 100 µs and approximately 5 ms. An artisan will recognize from the disclosure herein that many other switching times may also be used that are less than approximately 100 µs and greater than approximately 5 ms. For example, in one embodiment, the switching times may be as low as approximately 10 µs when using an electro-optic spatial light modulator.

As discussed above, the phase/amplitude modulator 110 includes adaptive optic elements that can implement beam shaping according to the embodiments disclosed herein. Such adaptive optic elements have not been widely used in laser processing applications due to their relatively high cost and lack of industrial-quality components. Recently, however, the selection of such components has broadened as costs have lowered to acceptable levels. Further, adaptive optic components that tolerate high power levels are becoming available due to the application of high-reflectivity dielectric coatings.

Liquid crystal based adaptive optic components, for example, may be used as phase/amplitude modulators 110. A liquid crystal modulator (not shown) may include an array of nematic or ferroelectric liquid crystal elements located between two layers of electrodes. One layer of electrodes may be micro-patterned to form an electrode array. By applying different voltages on the electrodes, the orientation of the liquid crystal molecules changes correspondingly. Thus, the refractive index or absorption in each liquid crystal element can be adjusted to modulate the wavefront of the input laser beam 116.

Figure 3:
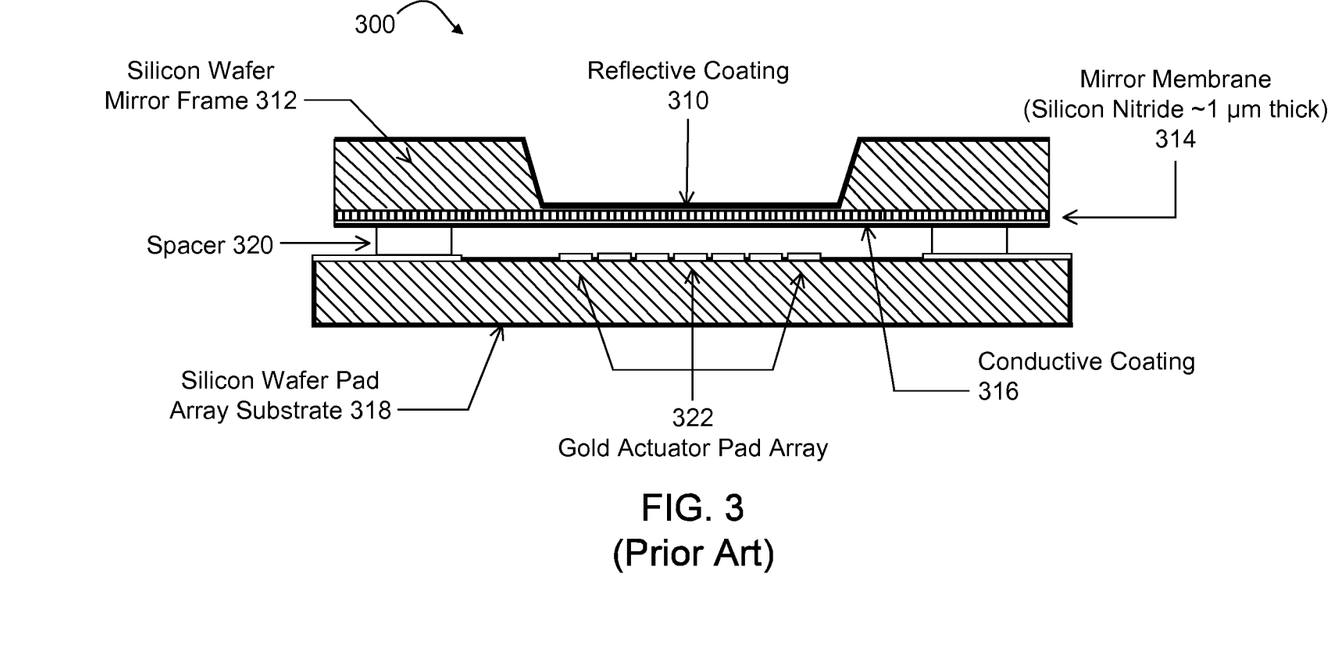
FIG. 3 is a schematic diagram illustrating a cross-sectional side view of a deformable mirror usable as a phase/amplitude modulator according to one embodiment.

Another type of adaptive optic component is a deformable mirror. For example, FIG. 3 is a schematic diagram illustrating a cross-sectional side view of a deformable mirror 300 usable as a phase/amplitude modulator 110 according to one embodiment. The deformable mirror 300 includes a reflective coating 310 on a silicon wafer mirror frame 312. The reflective coating 310 and mirror frame 312 are located over a mirror membrane 314 and conductive coating 316. The mirror membrane 314 may include, for example, a thin layer (e.g., on the order of approximately 1 µm thick) of silicon nitride. The mirror membrane 314 and conductive coating 316 are separated from a silicon wafer pad array substrate 318 by spacers 320. An actuator pad array 322 comprising a conductive material (e.g., gold) is formed over the silicon wafer pad array substrate 318. In operation, control voltages are applied to the actuator pad array 322 to electrostatically deform the mirror membrane 314. Thus, the control system 114 shown in FIG. 1 may provide control signals to the actuator pad array 322 to provide mirror surface optimization capability.

An artisan will recognize from the disclosure herein that the particular liquid crystal modulator and deformable mirror 300 described above are provided for illustrative purposes only, and that other configurations or adaptive optic components may also be used. For example, deformable mirrors may include segmented deformable mirrors formed by independent flat mirror segments, microelectormechanical systems (MEMS), or bimorph deformable mirrors formed by two or more layers of different materials.

Unlike liquid crystal modulators, deformable mirrors are generally not naturally programmable devices that can produce arbitrary shapes. Some deformable mirror technologies may be calibrated for use in "open-loop" mode to produce an arbitrary shape (within specified accuracy bounds). For example, Iris AO, Inc. of Berkeley, Calif. and other manufacturers provide deformable mirrors that can be well calibrated. When such a deformable mirror is used, the input beam characteristics may be sensed and the deformable mirror commanded in an open-loop manner without the need for feedback from the mirror. While open-loop beam shape control may be achieved with knowledge of the characteristics of the input beam 116 and the deformable mirror, however, such knowledge is not always adequately available. In some cases, the characteristics of the input beam 116 and/or the deformable mirror may deviate from a nominal specification. In such embodiments, the input control signals of the phase/amplitude modulator 110 are modified to obtain the desired characteristics of the output beam 118. In this case, other devices may be included in the processing system in order to monitor the characteristics of the input and/or output beams.

Such monitoring devices may include one or more metrology devices such as wavefront sensors (e.g., Shack-Hartmann, pyramid, and other wavefront sensors), point diffraction interferometers, plane mirror interferometers, and other metrology devices. Alternatively, the characteristics of the output beam 118 can be evaluated directly with elements such as charge-coupled device (CCD) cameras, complementary metal-oxide-semiconductor (CMOS) cameras, thermopile arrays, photodiode arrays, knife edge detectors, slit detectors, or other direct detection devices.

Figure 4:
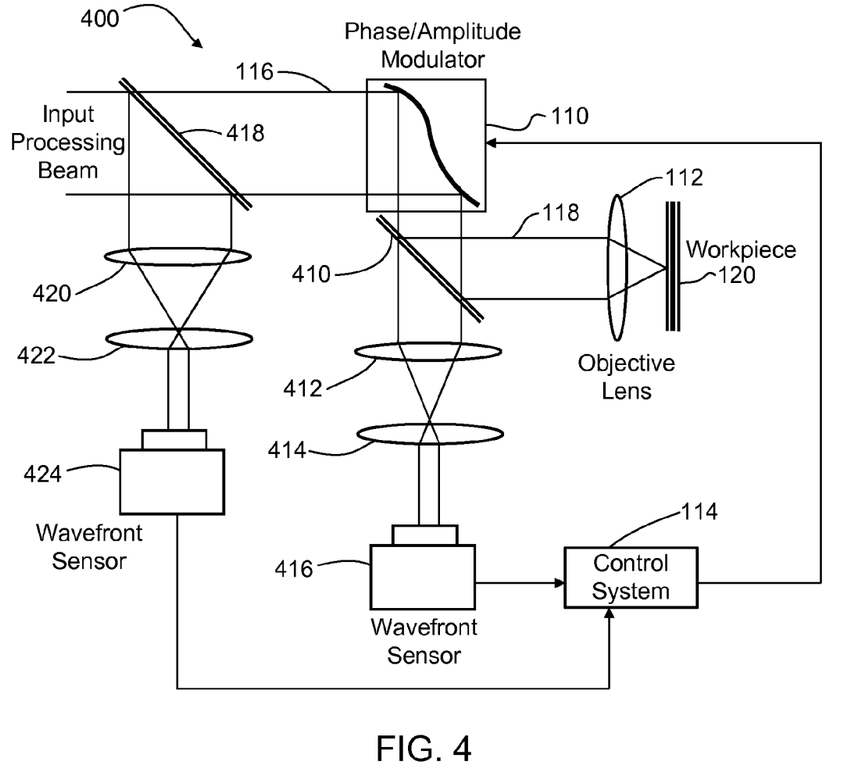
FIG. 4 is a block diagram of a laser processing system that includes feedback according to one embodiment.

For example, FIG. 4 is a block diagram of a laser processing system 400 that includes feedback according to one embodiment. The laser processing system 400 includes a phase/amplitude modulator 110 for receiving an input processing beam 116, and a beamsplitter 410 for directing a portion of the output beam 118 to a workpiece 120 through an objective lens 112. The beamsplitter 410 also directs a portion of the output beam 118 through a series of lenses 412, 414 to a wavefront sensor 416 in communication with a control system 114. The control system 114 is configured to compare the characteristics of the output beam 118 measured by the wavefront sensor 416 with a desired or predetermined set of characteristics. The control system 114 generates an objective function value used to optimize the characteristics of the output beam 118 used to process the workpiece 120. As discussed below, in some embodiments, the objective function value is in the form of an error signal. The lenses 412, 414 scale the split portion of the modulated output beam 118 to the wavefront sensor's 416 clear aperture, and cause the beam to conjugate to the principal plane of the objective lens. Using the lenses 412, 414 to scale the beam diameter introduces a scaling of the wavefront that the control system 114 takes into account when optimizing the characteristics of the output beam 118. Similarly, the control system 114 may take into account scaling of the input beam's wavefront provided by lenses 420, 422 discussed below.

In addition, or in another embodiment, the input beam 116 may also be monitored. For example, in some embodiments the system 400 includes another beamsplitter 418 that directs a portion of the input beam 116 through another series of lenses 420, 422 to another wavefront sensor 424 in communication with the control system 114. The control system 114 may be configured to compare the characteristics of the input beam 116 measured by the wavefront sensor 424 with a desired or predetermined set of input beam characteristics. The control system 114 may then control the phase/amplitude modulator 110 based at least in part on this comparison (e.g., it may be combined with the objective function value discussed above) to optimize the characteristics of the output beam 118.

By examining the characteristics of the input beam 116 and/or the output beam 118 and modifying the characteristics of the phase/amplitude modulator 110 in a feedback loop, the control system 114 optimizes the desired characteristics of the output beam 118 to within the limitations imposed by the optical system and the characteristics of the input beam 116. The laser processing system 400 dynamically corrects variations in the characteristics of the input beam 116 if feasible (e.g., if not limited by the constraints of the phase/amplitude modulator's capabilities or the physical limits imposed by diffraction or etendue), which is an advantage over hard-optic DOE elements which cannot be easily modified. Even in the case of input beam characteristics that prevent the desired output beam characteristics from being achieved, a best-case (but sub-optimal) output beam 118 may be adequate for use in the processing application.

Algorithms that may be used by the control system 114 to optimize the profile of the output beam 118 include indirect methods based maximizing an objective function that quantifies desirable characteristics of the output beam 118. For example, the control system 114 may use numerical optimization methods (e.g., genetic algorithms, local convex optimization, or other known numerical methods). In another embodiment, the control system 114 may use direct methods that explicitly take into account the characteristics of the input beam 116 and modify the characteristics of the phase/amplitude modulator 110 accordingly. For example, the control system 114 may directly apply Fourier transform algorithms to reshape a given input beam 116 to generate a desired output beam 118, accounting for the input beam's phase and amplitude distortions. In another embodiment, as discussed above, an iterative Gerchberg-Saxton algorithm may be used to pre-calculate the modulation.

Figure 5:
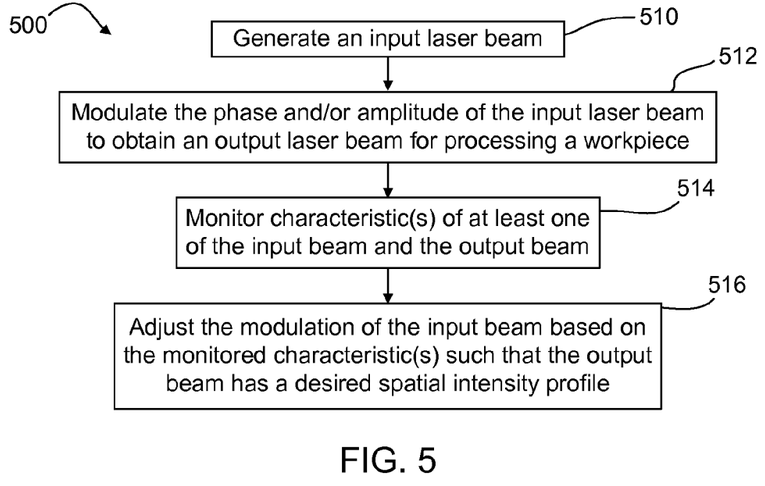
FIG. 5 is a flow diagram of a laser processing method using feedback according to one embodiment.

FIG. 5 is a flow diagram of a laser processing method 500 using feedback according to one embodiment. With reference to FIGS. 4 and 5, the method 500 includes generating 510 an input laser beam 116 and modulating 512 the phase and/or amplitude of the input laser beam to obtain an output laser beam 118 for processing a workpiece 120. The method 500 also includes monitoring 514 one or more characteristics of at least one of the input beam 116 and the output beam 118. The method 500 further includes adjusting 516 the modulation of the input beam 116 based on the monitored characteristics such that the output beam 118 has a desired spatial intensity profile.

As discussed above, in certain embodiments, a laser processing system includes the ability to work with non-ideal, high-$M^2$ beams by separating the beam modes, individually manipulating the high-quality (e.g., $TEM_{00}$) modes and other (non-$TEM_{00}$) modes, and recombining the beam modes into an output beam used for processing a workpiece. Because the higher-order beam components cannot produce very high resolution output beams due to the larger etendue of such beams, such embodiments may be applicable, for example, in the case where the output beam resolution requirement is moderate.

Figure 6:
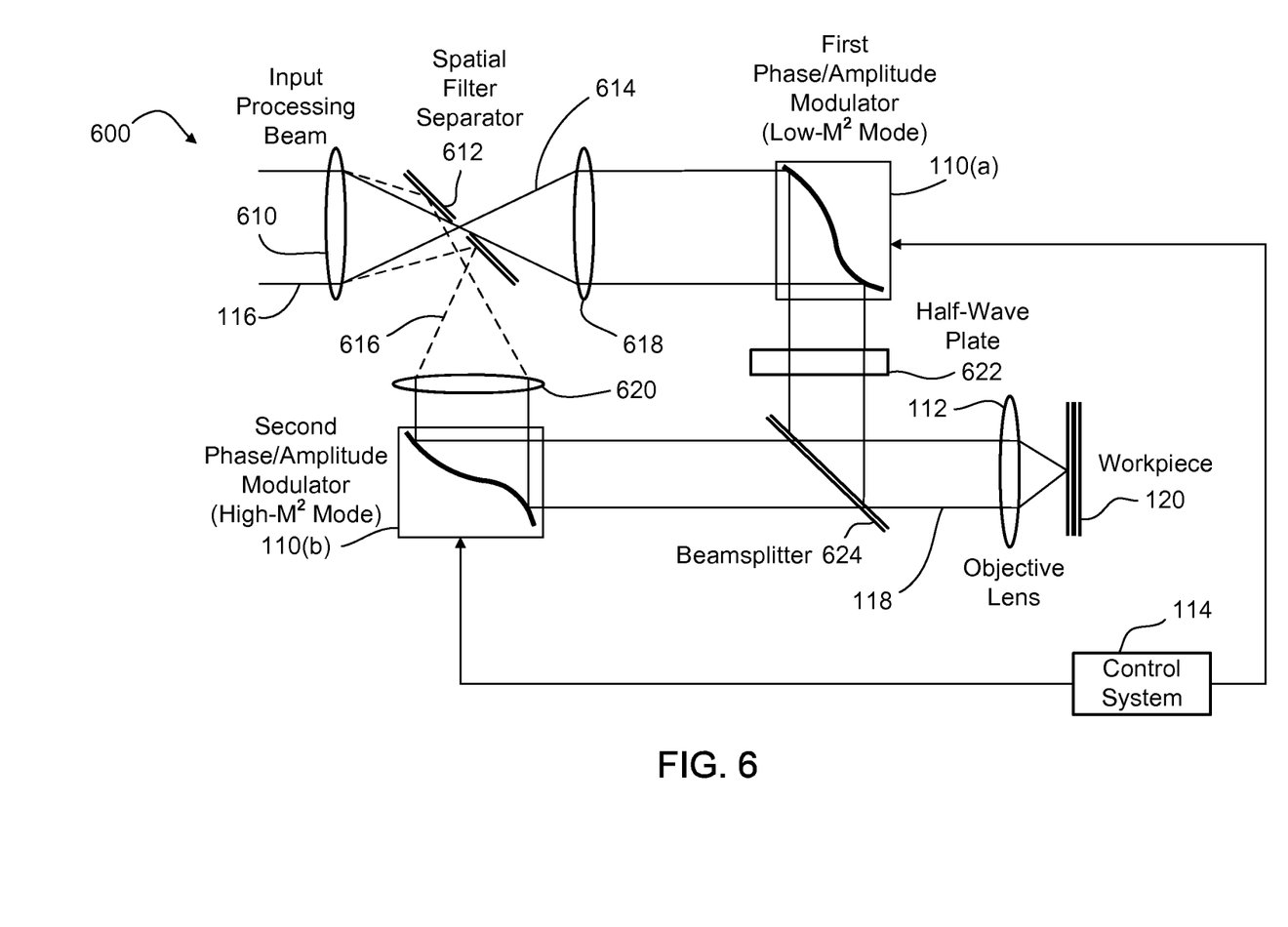
FIG. 6 is a block diagram of a laser processing system configured to separately modify high quality beam modes and low quality beam modes according to one embodiment.

FIG. 6 is a block diagram of a laser processing system 600 configured to separately modify high quality beam modes and low quality beam modes according to one embodiment. The system 600 includes an input lens 610 that focuses an input processing beam 116 onto a spatial filter separator 612 that spatially separates a low-order beam mode 614 from the remaining higher-order beam modes 616. The low-order beam mode 614 is recollimated by a lens 618 and provided to a first phase/amplitude modulator 110(a). The higher-order beam modes 616 are recollimated by another lens 620 and provided to a second phase/amplitude modulator 110(b).

Figure 7:
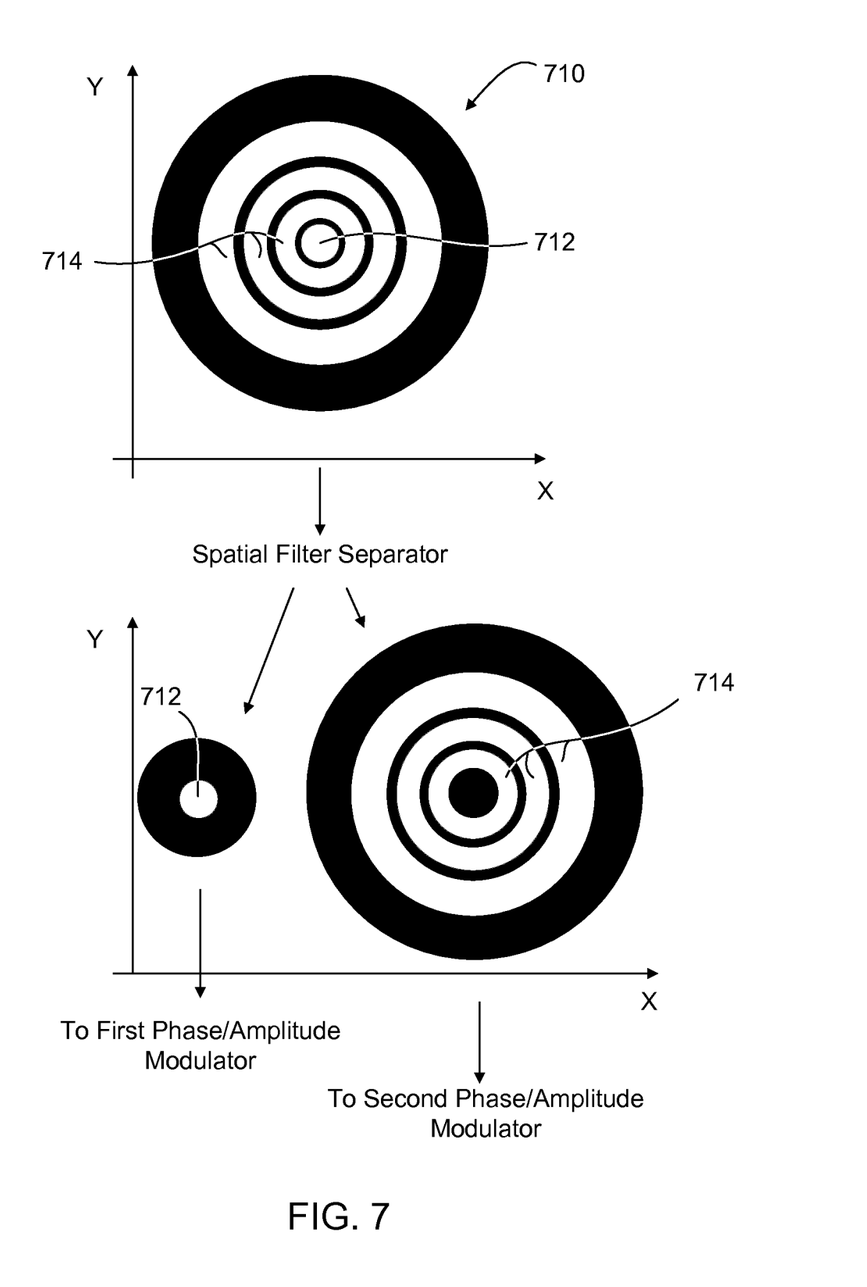
FIG. 7 is a schematic diagram illustrating the spatial filtering of the laser processing system shown in FIG. 6 according to one embodiment.

FIG. 7 is a schematic diagram illustrating the spatial filtering of the laser processing system 600 shown in FIG. 6 according to one embodiment. In this example, it is assumed that the input beam 116 is not a perfect plane wave. Thus, because of diffraction, the input lens 610 does not focus the input beam 116 to a single spot. Rather, as shown in FIG. 7, the input lens 610 produces a diffraction pattern 710 of light and dark regions in a focal plane (shown, e.g., in an XY plane) corresponding to the location of the spatial filter separator 612. In this example, the diffraction pattern 710 includes a central bright spot 712 surrounded by a series of concentric rings of light 714 (four shown). An artisan will recognize from the disclosure herein that many other diffraction patterns are possible.

The spatial filter separator 612 may include a tilted mirror having an aperture or "pin hole" that allows the desired light to pass to the first phase/amplitude modulator 110(a). In this example, the central bright spot 712 corresponding to the $TEM_{00}$ mode passes through the pin hole of the spatial filter separator 612 to the first phase/amplitude modulator 110(a), and the spatial filter separator 612 reflects the non-$TEM_{00}$ modes to the second phase/amplitude modulator 110(b). An alternative to the particular spatial filter separator 612 shown in FIG. 6 is discussed below with respect to FIG. 9. An artisan will recognize from the disclosure herein that other types of spatial filters may also be used.

The laser processing system 600 includes a control system 114 that independently controls the first phase/amplitude modulator 110(b) and the second phase/amplitude modulator 110(b) to separately modify the phase and/or amplitude of the $TEM_{00}$ mode and the non-$TEM_{00}$ modes. A half-wave plate 622 rotates the polarization of one of the modulated beams (e.g., the high quality, low-$M^2$ mode beam in the example shown in FIG. 7) so that a polarizing beamsplitter 624 can recombined the modulated beams to form an output beam 118. An objective lens 112 then focuses the output beam 118 to the workpiece 120.

The control system 114 adjusts the individual modulators 110(a), 110(b) to optimize the combined output beam. In general, the high-order (non-$TEM_{00}$, non-Gaussian) beam forms a relatively large spot, even after optimization, which may be acceptable as long as this spot size is within the desired shaped spot size. The low-order beam ($TEM_{00}$ Gaussian) may then be manipulated to "fill in" the rest of the beam profile to achieve a higher resolution. By using both the low-order and higher-order beam modes, the overall quality and resolution of the output beam 118 is increased without a reduction in the output beam's power that would otherwise result from discarding the higher-order beam modes.

Although not shown in FIG. 6, one or more sensors may provide feedback to the control system 114 for adjusting the first phase/amplitude modulator 110(a) and/or the second phase/amplitude modulator 110(b). For example, the laser spot on the workpiece 120 may be imaged or a portion of the output beam 118 may be directed to a CCD camera for analysis. The control system 114 may compare the profile of the output beam sensed with the camera to a profile of a desired or target reference beam in order to obtain an objective function value used to adjust at least one of the first phase/amplitude modulator 110(a) and the second phase/amplitude modulator 110(b).

In one embodiment, the objective function value obtained by the control systems 114 is in the form of an error signal $E_{signal}$. The spatial intensity profile of the target reference beam (target beam profile $I_{target}$) may be expressed as:

$$I_{target} = \exp[-(a(x-x_0))^{2m} - (b(y-y_0))^{2n}],$$

where a and b define the beam width in directions x and y, m and n are integers that specify the steepness of the beam sides, and $x_0$ and $y_0$ are the coordinates of the beam center. For the error signal $E_{signal}$, the RMS error between the target reference beam and the beam acquired by the camera may be represented by:

$$E_{signal} = [\Sigma_x \Sigma_y (I_{target}(x,y) - I_{camera}(x,y))^2]^{1/2},$$

where $I_{camera}$ is the spatial intensity profile measured by the camera.

The control system 114 uses the error signal $E_{signal}$ to adjust the inputs (e.g., voltages applied to an electrode array of an adjustable mirror) of at least one of the first phase/amplitude modulator 110(a) and the second phase/amplitude modulator 110(b).

Figure 8:
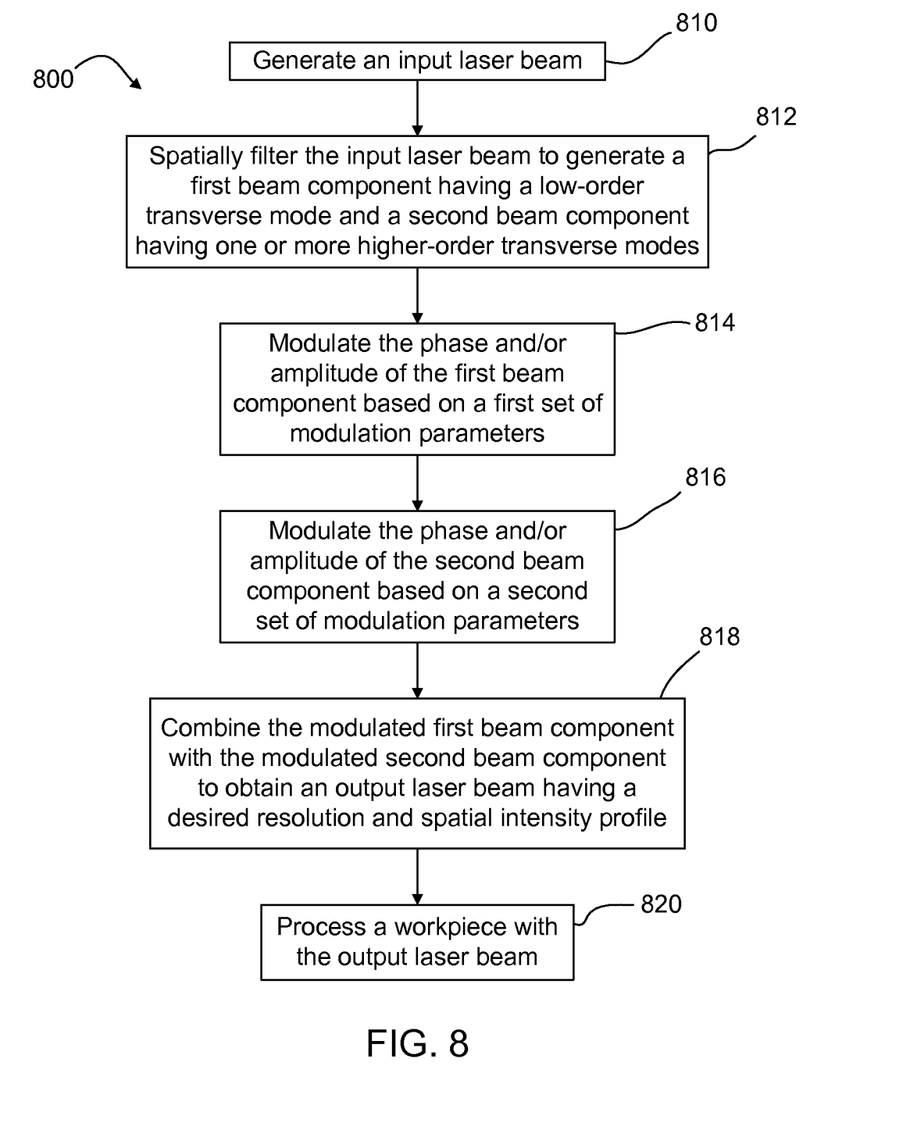
FIG. 8 is a flow diagram illustrating a laser processing method that separately modifies high quality beam modes and low quality beam modes according to one embodiment.

FIG. 8 is a flow diagram illustrating a laser processing method 800 that separately modifies high quality beam modes and low quality beam modes according to one embodiment. With reference to FIGS. 6 and 8, the method 800 includes generating 810 an input laser beam 116, and spatially filtering the input laser beam 116 to generate a first beam component 614 that has a low-order transverse mode and a second beam component 616 that has one or more higher order transverse modes.

The method 800 further includes modulating 814 the phase and/or amplitude of the first beam component 614 based on a first set of modulation parameters. The first set of modulation parameters may be selected, for example, based on a desired spatial intensity profile and/or resolution. The method 800 also includes modulating 816 the phase and/or amplitude of the second beam component 616 based on a second set of modulation parameters. The second set of modulation parameters may be selected, for example, based on the desired spatial intensity profile. In certain embodiments, the second set of modulation parameters is different than the first set of modulation parameters.

The method 800 also includes combining 818 the modulated first beam with the modulated second beam to obtain an output laser beam 118 that has the desired resolution and spatial intensity profile substantially located at the focal plane of the objective lens 112. The method 800 further includes processing 820 a workpiece 120 with the output laser beam 118.

This approach allows the two modulators 110(a), 110(b) to separately manipulate the two beams 614, 616 and use the capabilities of each beam 614, 616 with little or no compromise (e.g., without reducing power by discarding non-$TEM_{00}$ modes). Another approach, however, is to use a single modulator to manipulate the phase and/or amplitude characteristics of the unseparated beam, and use the optimization methods described above to optimize the output beam characteristics. Depending on the characteristics of the high-quality and low-quality beam components, and the output beam requirements, this approach may be sufficient.

Figure 9:
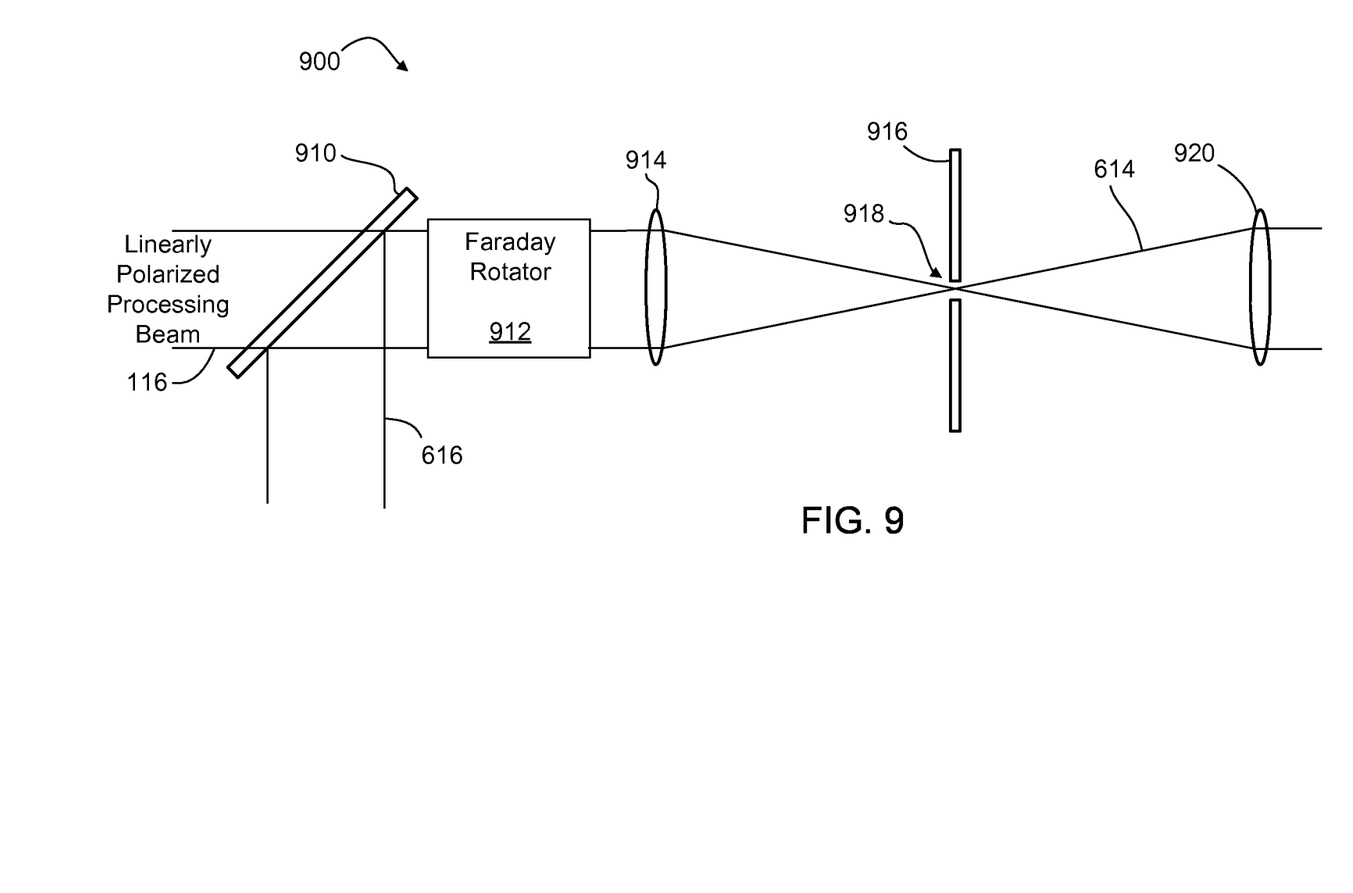
FIG. 9 is a block diagram of a spatial filter for separating a linearly polarized processing beam into high quality and low quality components according to one embodiment.

FIG. 9 is a block diagram of a spatial filter 900 for separating a linearly polarized processing beam 116 into high quality and low quality components according to one embodiment. The spatial filter 900 shown in FIG. 9 may replace the spatial filter separator 612 (and one or more of the lenses 610, 618, 620) in the system 600 shown in FIG. 6. The spatial filter 900 includes a polarization sensitive beam splitter 910, a Faraday rotator 912, a first lens 914, a mirror 916 having an aperture 918, and a second lens 918.

The polarization sensitive beam splitter 910 is configured to pass the linearly polarized processing beam 116 to the Faraday rotator 912. The Faraday rotator 912 rotates (e.g., by 45°) the polarization of the linearly polarized processing beam 116. The first lens 914 focuses the rotated beam on the aperture 918 in the mirror 916. The low-order beam mode 614 of the rotated beam passes through the aperture 918 to the second lens 920, which recollimates the low-order beam mode 614 and passes it to the first phase/amplitude modulator 110(*a*) discussed above.

The mirror 916 reflects the higher-order beam modes 616 of the rotated beam received from the first lens 914 back through the first lens 914 and the Faraday rotator 912, which further rotates (e.g., by an additional 45°) the polarization of the higher-order beam modes 616 such that they are reflected by the polarization sensitive beam splitter 910 to the second phase/amplitude modulator 110(*b*) discussed above.

The embodiments disclosed herein provide quick and flexible modification of the intensity profile of a processing laser beam in order to determine and implement the optimum beam profile for a particular application, and/or subset of the application. This reduces the sensitivity of beam shaping subsystems to variations in the laser processing system, including those due to manufacturing tolerances, thermal drift, variations in component performance, and other sources of system variation. Certain embodiments manipulate lower quality laser beams (higher $M^2$ values) to provide acceptable shaped beam profiles. The embodiments described herein also simultaneously provide additional functions such as beam alignment, focal plane adjustment, processing beam wavefront correction, and other advantages.

It will be understood by those having skill in the art that many changes may be made to the details of the above-described embodiments without departing from the underlying principles of the invention. For example, in one embodiment, the corrected output of the phase/amplitude modulator 110 shown in FIG. 4 may be directed to a diffractive optical element (DOE) that shapes the output beam 118 with desired characteristics (e.g., peak intensity variation, spatial cutoff band, maximum sidelobe amplitude, and other characteristics). The phase/amplitude modulator 110 accounts for deviations in the input beam 116 such that the DOE operates as intended. Those skilled in the art will recognize other variations to the disclosed embodiments from the disclosure herein. The scope of the present invention should, therefore, be determined only by the following claims.

The invention claimed is:

1. A laser processing system using a selectively shaped spatial intensity profile, the system comprising:
a laser source to generate an input laser beam;
a spatial filter to spatially separate the input laser beam into a first beam component and a second beam component;
a first adaptive optic element to modulate at least one of the phase and the amplitude of the first beam component; and
optics to recombine the modulated first beam component and the second beam component into an output laser beam for processing a workpiece.

2. The system of claim 1, further comprising:
a second adaptive optic element to modulate at least one of the phase and the amplitude of the second beam component before the first beam component and the second beam component are recombined.

3. The system of claim 1, wherein the first beam component comprises a low order transverse mode and the second beam component comprises a high order transverse mode.

4. The system of claim 1, wherein the first beam component comprise a high order transverse mode and the second beam component comprises a low order transverse mode.

5. The system of claim 1, further comprising a control system to control the modulation of the first adaptive optic element for adjusting a first spatial intensity profile of the output laser beam substantially located at a focal plane of an objective lens.

6. The system of claim 5, wherein the control system is further configured to:
select the first spatial intensity profile of the output laser beam when processing a first portion of the workpiece; and
change the modulation of the first adaptive optic element to switch from the first spatial intensity profile to a second spatial intensity profile substantially located at the focal plane of the objective lens when processing a second portion of the workpiece.

7. The system of claim 6, wherein a switching time for changing from the first spatial intensity profile to the second spatial intensity profile is in a range between approximately 10 µs and approximately 5 ms.

8. The system of claim 5, further comprising a sensor to measure characteristics of at least one of the input laser beam and the output laser beam, wherein the control system determines an objective function value between predetermined characteristics of the first spatial intensity profile and the measured characteristics, and wherein the control system adjusts the first adaptive optic element based on the objective function value.

9. The system of claim 8, wherein the sensor is selected from the group comprising a wavefront sensor, a charge-coupled device (CCD) camera, a complementary metal-oxide-semiconductor (CMOS) camera, a thermopile array, a photodiode array, a knife edge detector, and a slit detector.

10. The system of claim 1, wherein the first adaptive optic element is selected from the group comprising a deformable mirror, a liquid crystal modulator, and an electro-optic spatial light modulator.

11. The system of claim 1, wherein the low-order transverse mode is a $TEM_{00}$ mode.

12. A method for processing a workpiece using a laser beam with a selectively shaped spatial intensity profile, the method comprising:
spatially filtering an input laser beam into a first beam component and a second beam component;
modulating at least one of the phase and the amplitude of the first beam component;
recombining the modulated first beam component and the second beam component into an output laser beam with a first spatial intensity profile substantially located at a focal plane of an objective lens; and
processing a first portion of the workpiece with the output laser beam.

13. The method of claim 12, further comprising:
modulating at least one of the phase and the amplitude of the second beam component.

14. The method of claim 13, wherein the first beam component is modulated using a first set of modulation characteristics, wherein the second beam component is modulated using a second set of modulation characteristics, and wherein the second set of modulation characteristics are independent of the first set of modulation characteristics.

15. The method of claim 12, wherein in the first beam component comprises a low order transverse mode and the second beam component comprises a high order transverse mode.

16. The method of claim 12, wherein the first beam component comprise a high order transverse mode and the second beam component comprises a low order transverse mode.

17. The method of claim 12, wherein the first portion of the workpiece is associated with a first type of feature and a second portion of the workpiece is associated with a second type of feature, the method further comprising:
   adjusting the modulation of the first beam component to switch from the first spatial intensity profile to a second spatial intensity profile associated with the second type of feature;
   processing the second portion of the workpiece with the output laser beam having the second spatial intensity profile substantially located at the focal plane of the objective lens.

18. The method of claim 17, further comprising switching from the first spatial intensity profile to the second spatial intensity profile during a switching time that is in a range between approximately 10 µs and approximately 5 ms.

19. The method of claim 12, further comprising:
   measuring characteristics of at least one of the input laser beam and the output laser beam;
   determining an objective function value between predetermined characteristics of the first spatial intensity profile and the measured characteristics; and
   adjusting the modulation of at least one of the first beam component based on the objective function value to optimize the first spatial intensity profile.

20. The method of claim 12, wherein modulating the first beam component comprises controlling modulation parameters of an adaptive optic element selected from the group comprising a deformable mirror, a liquid crystal modulator, and an electro-optic spatial light modulator.

* * * * *